though excellent results are obtained with an amount of diluent ranging from about 2 to about 50 mols per mol of the R₃M compound.

3,193,566
ORGANOALUMINUM COMPOUND PREPARATION
John E. Wicklatz, Minneapolis, Minn., and Boris Franzus, Linden, N.J., assignors to Phillips Petroleum Company, a corporation of Delaware
No Drawing. Filed Apr. 26, 1961, Ser. No. 105,566
2 Claims. (Cl. 260—448)

This application is a continuation-in-part of our copending U.S. patent application Serial No. 821,105, filed on June 18, 1959, now Patent 3,022,283 dated February 20, 1962. The latter application is a continuation-in-part of our U.S. patent application Serial No. 769,558, filed on October 25, 1958, and now abandoned.

This invention relates to novel organometallic compounds and to a process for their preparation.

In recent years, several processes for polymerizing olefins to solid polymers have been developed. Certain of these processes employ catalysts which contain organometallic compounds. As a result, there has been a great deal of interest in the development of processes for producing well known organometal compounds, such as trialkylaluminum and alkylaluminum halides, as well as in processes for preparing novel organometal compounds. The present invention is concerned with novel organometal compounds which can be advantageously used in catalyst systems suitable for the polymerization of certain olefins.

It is an object of this invention to provide a novel organometal compound.

Another object of the invevntion is to provide a process for preparing novel organometal compounds.

A further object of the invention is to provide an organometal compound which may be used with advantage in catalyst systems suitable for the polymerization of olefins.

Other and further objects and advantages of the invention will become apparent to those skilled in the art upon consideration of the accompanying disclosure.

The present invention resides in the discovery of novel organometallic compounds having the following general formula:

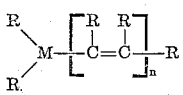

wherein M is an element selected from the group consisting of boron, aluminum, gallium, indium and thallium, R is a hydrocarbon radical selected from the group consisting of alkyl, cycloalkyl, aryl, and combinations of these radicals, such as alkaryl and aralkyl, each of the hydrocarbon radicals preferably containing from 1 to 16, inclusive, carbon atoms, and $n$ is an integer from 2 to 6, inclusive. It is to be understood that R radicals can be the same or that they can be different. Specific examples of organometal compounds of the present invention include diethyl-1,2,3,4-tetraphenyl - 1,3 - hexadienylaluminum; diethyl-1,2,3,4-tetramethyl-1,3-hexadienylaluminum; diethyl - 1,3-diphenyl-2,4-dimethyl-1,3 - hexadienylaluminum; dibutyl-1,2,3,4,5,6-hexaphenyl - 1,3,5 - decatrienylaluminum; didecyl-1,2,3,4-tetraamyl-1,3-tetradecadienylaluminum; dimethyl-1,2,3,4-tetra(4-biphenyl)-1,3-pentadienylaluminum; diphenyl-1,2,3,4-tetra[4(2,2′ - dimethylbiphenyl)]-4-phenyl - 1,3-butadiene; didodecyl - 1,2,3,4-tetra(2 - methylphenyl) - 1,3 - octadecadienylaluminum; dicyclohexyl-1,2,3,4-tetraphenyl - 4-cyclohexyl - 1,3-butadienylaluminum; di-tert-butyl-1,2,3,4-tetramethyl-5,5-dimethyl-1,3-hexadienylaluminum; diethyl - 1,3-dioctyl-2,4-dihexadecyl-1,3-hexadienylaluminum; and diethyl-1,2,3,4-tetrahexadecyl-1,3-hexadienylaluminum; diethyl-1,2,3,4,5,6,7,8,9,10,11,12 - dodecaphenyl - 1,3,5,7,9,11 - tetradecahexaenylaluminum; diphenyl - 1,2,3,4,5,6,7,8,9,10 - decamethyl-10-phenyl - 1,3,5,7,9 - undecapentaenylaluminum, and the like. It is to be understood that the corresponding compounds of boron, gallium, indium and thallium are applicable and fall within the scope of the present invention.

The novel organometallic compounds of this invention can be prepared by any suitable method. In a preferred method for their synthesis, a compound having the formula $R_3M$, wherein R is a hydrocarbon radical as defined above, and M is an element selected from the group consisting of boron, aluminum, gallium, indium and thallium, is reacted with a disubstituted acetylene, employing a halide of a metal from Group IV, V–A VI–A or VIII (Mendeléeff's Periodic System) as a catalyst.

Examples of suitable compounds having the formula $R_3M$ include triethylboron, triethylaluminum, tri-n-butylaluminum, triisobutylgallium, trimethylindium, triisobutylthallium, tri-n-pentylaluminum, triisooctylaluminum, tri-n-dodecylaluminum, triphenylaluminum, triphenylindium, diphenylmethyloboron, trihexadecylgallium, tri - tert-tetradecylaluminum, di(methylphenyl)octylthallium, tricyclohexylboron, tri(4-phenyldecyl)aluminum, di(2-decylcyclohexyl)methylgallium, tri(2 - cyclohexylbutyl)aluminum, and the like.

Disubstituted acetylenes which can be used in the synthesis corresponds to the formula $R-C\equiv C-R$, wherein R is a hydrocarbon radical, preferably containing from 1 to 16, inclusive, carbon atoms, as defined hereinabove. Examples of suitable disubstituted acetylenes include diphenylacetylene, dimethylacetylene, diethylacetylene, methyl-n-propylacetylene, methylethylacetylene, 1-n-butyl-2-phenylacetylene, di-n-hexylacetylene, methyl-n-amylacetylene, di-n-octylacetylene, methyl-n-hexadecylacetylene, di-tert-dodecylacetylene, di(4-methylphenyl)acetylene, di(4 - biphenyl)acetylene, di[2-(3-methylbiphenyl)]acetylene, dicyclohexylacetylene, di(2 - methylcyclopentyl acetylene, di(2-cyclohexylpropyl)-acetylene, 1 - benzyl-2-(2-phenylbutyl)acetylene[1,5-diphenyl-2-heptyne], 1-(3-butylphenyl)-2-hexadecylacetylene, and the like.

As previously mentioned, the reaction between the trialkyl compound and the disubstituted acetylene is carried out in the presence of a metal halide. It is within the scope of the invention to employ any of the metal halides, i.e., chloride, iodides, bromides and fluorides. However, the metal halide is preferably a chloride of a metal of Groups IV, V–A, VI–A or VII of the periodic system. Examples of suitable compounds include titanium trichloride, titanium tetrachloride, zirconium tetrachloride, vanadium tetrachloride, molybdenum pentachloride, iridium tetrachloride, nickelous chloride, cobaltous chloride, and the like.

Usually, the disubstituted acetylene used in preparing the compounds of this invention is substantially completely reacted with the organometallic compound having the formula $R_3M$. Accordingly, the number of mols of disubstituted acetylene employed will be substantially that number which will yield the desired product. In other words, depending upon the particular product desired, from about 2 to 6 mols of the disubstituted acetylene is employed per mol of the $R_3M$ compound.

The reaction between the trialkyl compound and the disubstituted acetylene is preferably carried out in the presence of a hydrocarbon diluent, which is substantially inert and liquid under the conditions used. Suitable diluents include paraffinic, cycloparaffinic, and/or aromatic hydrocarbons. Examples of such diluents include propane, butane, pentane, hexane, cyclohexane, methylcyclohexane, benzene, toluene, the xylenes, and the like. It is to be understood that mixtures of these materials can be used as the diluent. The amount of diluent used can vary over a rather wide range, for example, from about 1 to about 10 liters per mol of total reactants charged. The reaction can be effected at temperatures ranging from 0 to 150° C., preferably from about 20 to about 125° C. The reaction time is usually in the range of 2 minutes to about 20 hours.

It has been found that when the metal compound used as the catalyst is employed in a valence state lower than its maximum, the reaction is directed principally to the production of compounds in which $n$ is 2. However, when the metal compound used is in its highest valence state, compounds in which $n$ is 3, 4, 5 or 6 can be obtained.

The reaction mixture comprises two phases. There is a liquid phase in which the organometal compound of the invention is concentrated as a solution in the diluent used, and a solid phase comprising the metal compound which has served as the catalyst. These phases can be readily separated by filtration, centrifugation, or other suitable means, thereby isolating the novel organometal compound as a solution in the diluent.

As previously mentioned, the organometal compounds of this invention can be used as a component of an olefin polymerization catalyst system. In these systems, the organometal compounds are often employed with compounds of transition metals of Groups IV, V-A, VI-A, or VIII. The transition metal compounds used in the catalyst systems are similar to the metal compounds used as catalysts in the preparation of the organometal compounds of this invention. As discussed above, in preparing the organometal compounds, the liquid phase containing the compound is separated from a solid phase comprising the catalyst. When it is desired to employ the organometal compound as an olefin polymerization catalyst, it is often convenient to employ as the catalyst in the polymerization the total reaction product obtained when preparing the organometal compound of this invention. For example, when diethyl-1,2,3,4-tetraphenyl-1,3-hexadienyl-aluminum is prepared from diphenylacetylene and triethylaluminum using titanium trichloride as the catalyst and cyclohexane as the diluent, the solution phase containing the organometal compound and the solid phase in which the titanium trichloride is concentrated can then be charged together as the total catalyst system for the olefin polymerization. When using such an olefin polymerization catalyst, it has been found that propylene can be polymerized in good yields to provide polypropylene having an isotactic content of 93 percent or even higher and having a flexural modulus of 175,000 and higher.

The organometal compounds of this invention are particularly suitable for use in catalyst systems employed in the polymerization of olefins having the general formula $R'CH=CH_2$, in which R is an alkyl radical containing from 1 to 4 inclusive, carbon atoms, a phenyl radical, of an alkyl-substituted phenyl radical. Examples of such olefins include propylene, 1-butene, 1-pentene, 3-methyl-1-butene, 3-methyl-1-pentene, 4-methyl-1-pentene, 3,3-dimethyl-1-butene, styrene, 2-methylstyrene, 4-methylstyrene, and the like.

A more comprehensive understanding of the invention can be obtained by referring to the following illustrative examples, which are not intended, however, to be unduly limitative of the invention.

EXAMPLE I

In a series of runs, diphenylacetylene was contacted with triethylaluminum and/or titanium trichloride at elevated temperatures. In these tests, the triethylaluminum and diphenylacetylene were charged as solutions in cyclohexane. For each test the components used were charged to a glass vessel, which was heated and observed for any chemical reaction. The results of these tests are shown below in Table I.

*Table I*

| Run No. | DPA [a] | | TEA | | TiCl₃ | | Temp., °C. | Reaction |
|---|---|---|---|---|---|---|---|---|
| | Gm. | Millimoles [1] | Gm. | Millimoles [1] | Gm. | Millimoles [1] | | |
| 1 | 0.034 | 0.191 | | | 0.1 | 0.65 | 83.3 | None. |
| 2 | 0.034 | 0.191 | 0.219 | 1.92 | 0.1 | 0.65 | ca 20 | Rapid Reaction. |
| 3 | 0.034 | 0.191 | 0.219 | 1.92 | 0.1 | 0.65 | 83.3 | Do. |
| 4 | 3.56 | 20.0 | 7.2 | 63 | | | 87.0 | Very Slow Reaction.[b] |

[a] Diphenylacetylene.
[b] Products were tetraphenylbutadiene and cis-alpha-ethylstilbene.

The data in Table I show that under the conditions maintained diphenylacetylene reacts very slowly with triethylaluminum and that when titanium trichloride is added to the system a rapid reaction takes place, even at room temperature. It also shows that no reaction took place between diphenylacetylene and titanium trichloride under the same conditions.

EXAMPLE II

A glass reactor was charged with .912 gram of diphenylacetylene (16.0 ml. of 0.32 molar solution in cyclohexane), 3.65 grams of triethylaluminum (20.0 ml. of 1.6 molar solution in cyclohexane), and 1.54 grams titanium trichloride. The system was heated for 1.5 hours at 91° C., after which it was cooled and diluted with dry cyclohexane. The reactor contents were then centrifuged at 3000 r.p.m. to separate the solid from the liquid. The solid was washed with cyclohexane, and both solid and liquid materials were treated with 2.0 molar hydrochloric acid to decompose organometals present. The products were dried overnight with anhydrous potassium carbonate. Cyclohexane was removed by heating under vacuum.

Examination of the solid and liquid phases showed that about 95 percent of the titanium was concentrated in the solid product and that organic products were concentrated in the liquid material, approximately 90 percent of the acetylenic residue being accounted for therein.

EXAMPLE III

To a glass reaction vessel, there was charged 0.775 gram of triethylaluminum (4.3 ml. of 1.58 molar solution in cyclohexane), 0.35 gram of titanium trichloride, and 0.836 gram of diphenylacetylene (9.4 ml. of 0.5 molar solution in cyclohexane). This volume of materials was increased to 15 ml. by adding 1.3 ml. of cyclohexane. The reactor was sealed and heated at 100 to 102° C. for six hours during which time the reaction was followed by observing depletion of diphenylacetylene by an ultraviolet spectrophotometer. Heating was stopped when this component was 100 percent consumed. The product from the reaction comprised two phases, one a solid the other a liquid as described in Example II.

A portion of the total product was treated with 2 normal hydrochloric acids to hydrolyze any organometal group which may have been present. The aqueous phase was then removed, and the organic phase was dried over potassium carbonate. Cyclohexane was removed under vacuum, and the residual material, a sticky, viscous substance, was subjected to examination by nuclear magnetic resonance. It was found by this examination that the ratio of phenyl hydrogen to ethyl hydrogen was 4.3±30 percent and that a definite amount of vinyl hydrogen was present. This value indicates that the composition of the hydrolyzed liquid product had the following formula:

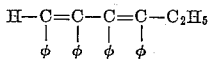

The symbol $\phi$ as used herein represents a phenyl radical.

EXAMPLE IV

A run was made according to the procedure described in Example II, the reaction being carried to completion as indicated by observing the reaction with an ultraviolet photospectrometer. The product was treated with 2.0 molar hydrochloric acid to decompose organometals, dried overnight with potassium carbonate, and stripped of cyclohexane under vacuum. The molecular weight of the hydrolyzed product was found to be 419, which substantially corresponds to the calculated value of 386 for $C_{30}H_{26}$. Molecular weight, based on nuclear magnetic resonance values which showed the presence of slightly more than two diphenylacetylene units, was 415.

EXAMPLE V

Two reaction vessels were each charged with 0.56 grams of diphenylacetylene (10 ml. of 0.032 molar solution in cyclohexane), 0.365 gram of triethylaluminum (2 ml. of 1.6 molar solution in cyclohexane), and 0.150 gram of titanium trichloride. The reactors were closed and allowed to stand for 2.5 hours at room temperature. To the reaction mixture from each vessel, there was added 2.0 ml. of a mixture of deuterium oxide and water, which contained about 0.5 weight percent of deuterium oxide, to decompose organometals. Thereafter, 4.0 ml. of carbon tetrachloride was added to each reaction mixture. The mixtures were combined and filtered, the vessels being rinsed with 20 ml. of cyclohexane. The combined filtrate and wash liquid was shaken with 10.0 ml. of the aforementioned mixture of deuterium oxide and water and dried over anhdyrous sodium carbonate overnight. Nuclear magnetic resonance studies were made on this product solution to determine the ratio of hydrogen to deuterium.

By this test it was shown that 90 percent of the vinyl hydrogen found in Example III had been replaced by deuterium, showing that a metal had been replaced in the hydrolysis procedure. This result indicates that the formula for the compound contains the following structure:

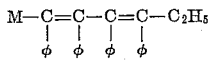

where M is a metal. Since the only metals in the system were aluminum and titanium and since essentially all the titanium was removed with the solid phase, the formula can be expressed as follows:

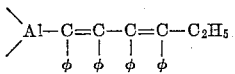

The foregoing data show that an ethyl group of the triethylaluminum was replaced by a 1,2,3,4-tetraphenyl-1,3-hexadienyl group.

EXAMPLE VI

Since in Example IV the examination of the compound present in the liquid phase of the reaction product was made subsequent to a hydrolyzing step in which the organometal was decomposed, the data obtained showed the structure of a group replacing an ethyl group of the triethylaluminum. In order to determine what happened to the remaining two ethyl groups of the triethylaluminum, the following tests were made.

To a glass reactor, there was charged 0.89 gram (5.0 millimoles) of diphenylacetylene as a 0.5 molar solution in cyclohexane, 0.360 gram (3.16 millimoles) of triethylaluminum as a 2.0 molar solution in cyclohexane, and 0.15 gram (1 millimole) of titanium trichloride. There was then added 13 ml. of dry cyclohexane after which the vessel was sealed, and the temperature was raised to 100 to 102° C. for six hours. During the heating period the reaction was followed by an ultraviolet spectrophotometer, which provided means for measuring depletion of diphenylacetylene. The results of these measurements are shown in Table II.

Table II

| Time, min. | DPA[1] Reacted, Percent | Time, min. | DPA Reacted, Percent |
|---|---|---|---|
| 0 | 0.0 | 210 | 71.0 |
| 30 | 13.0 | 240 | 71.0 |
| 60 | 24.5 | 270 | 71.0 |
| 90 | 37.0 | 300 | 71.0 |
| 120 | 51.0 | 330 | 71.0 |
| 150 | 71.0 | 360 | 71.0 |
| 180 | 71.0 | | |

[1] Diphenylacetylene.

At the end of 6 hours, the reactor was cooled, and 0.18 gram (1.58 millimoles) of triethylaluminum was added to the system. The temperature was again elevated to 100 to 102° C. for an addition period of 3 hours. Measurements indicating depletion of diphenylacetylene during this period are set forth in Table III.

Table III

| Total time, min.: | DPA reacted, percent |
|---|---|
| 360 | 71.0 |
| 390 | 77.5 |
| 420 | 85.5 |
| 450 | 89.0 |
| 540 | 100.0 |

As seen from Table II, it is apparent that at 150 minutes all triethylaluminum had been reacted but that 29 percent of the diphenylacetylene remained unconverted. Halting of the reaction was caused by depletion of triethylaluminum as shown by the fact that addition of more triethylaluminum (Table III) led to the reaction being resumed and going to completion. In the original charge there was 3.16 millimoles of triethylaluminum and 5.0 millimoles of diphenylacetylene. Since two molecules of diphenylacetylene replaced one ethyl group, as is apparent from the structure determined by nuclear magnetic resonance (see Example III), then if more than one ethyl group of the triethylaluminum were displaced, the diphenylacetylene would have been completely depleted in the first reaction period and the addition of a further amount of triethylaluminum would not have led to resumption of reaction. Thus, it is apparent from the foregoing data that only one ethyl group was displaced and that the compound (diethyl-1,2,3,4-tetraphenyl-1,3-hexadienylaluminum) had the following formula:

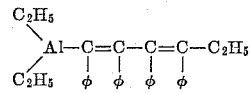

EXAMPLE VII

A run was made in which diphenylacetylene was reacted with triethylaluminum in the presence of titanium tetrachloride as the catalyst. The charge used and reaction conditions are shown below in Table IV.

Table IV

| | | |
|---|---|---|
| Triethylaluminum [1] | millimoles | 0.385 |
| Diphenylacetylene [2] | do | 2.5 |
| TiCl$_4$ | do | 0.1975 |
| Cyclohexane | milliliters | 7.0 |
| Temperature | ° C | 100–102 |
| Time | hours | 7 |

[1] 1.2 ml. 0.32 molar solution in cyclohexane.
[2] 5.0 ml. 0.5 molar solution in cyclohexane.

In this run, 0.328 gram of hexaphenylbenzene formed as a crystalline solid was removed. The dissolved organometal product of the reaction, which was identified by nuclear magnetic resonance as having three molecules of diphenylacetylene, was diethyl-1,2,3,4,5,6-hexaphenyl-1,3,5-octatrienylaluminum.

EXAMPLE VIII

In order to test diethyl-1,2,3,4-tetraphenyl-1,3-hexadienylaluminum as a polymerization initiator, an additional amount of this product is prepared by reacting diphenylacetylene with triethylaluminum as described in Example III.

Approximately three moles of this product is combined with one mole of titanium trichloride in a stainless steel reactor along with 1500 ml. cyclohexane. Propylene is then charged to the reactor to a pressure of about 100 p.s.i.g. The temperature is raised to 215° F. and maintained in the range between 215 and 250° F. for about two hours. Polypropylene having an isotactic content above about 90 percent is recovered in high yields.

It will be apparent to those skilled in the art that many variations and modifications of the invention can be made upon study of the foregoing disclosure. Such variations and modifications are believed to come within the spirit and scope of the present invention.

We claim:

1. A process for preparing a compound of the formula

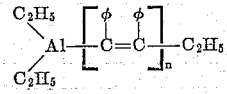

where $n$ is an integer from 2 to 6, inclusive, said process comprising the steps of contacting in a hydrocarbon diluent triethylaluminum with diphenylacetylene in the presence of titanium trichloride, the number of mols of said diphenylacetylene per mol of triethylaluminum being in the range of 2 to 6, inclusive, and the amount of said titanium trichloride being in the range of 0.1 to 1.0 mol per mol of said triethylaluminum, said contacting occurring at a temperature in the range of 0 to 150° C.; recovering a reaction product comprising a liquid phase containing the desired organometal compound and a solid phase; and separating said liquid phase from said solid phase.

2. A process for preparing a compound of the formula

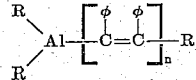

when $n$ is an integer from 2 to 6, inclusive, said process comprising the steps of contacting in a hydrocarbon diluent a compound of the formula $R_3Al$ where R is a hydrocarbon radical selected from the group consisting of alkyl, cycloalkyl, aryl and combinations of these radicals, with diphenylacetylene in the presence of titanium trichloride, the number of mols of said diphenylacetylene per mol of $R_3Al$ being in the range of 2 to 6, inclusive, and the amount of said titanium trichloride being in the range of 0.1 to 1.0 mol per mol of said $R_3Al$, said contacting occurring at a temperature in the range of 0 to 150° C.; recovering a reaction product comprising a liquid phase containing the desired organometal compound and a solid phase; and separating said liquid phase from said solid phase.

References Cited by the Examiner

UNITED STATES PATENTS 2,967,875   1/61   Wilke _____ 260—448

FOREIGN PATENTS 581,625   8/59   Canada.
1,044,082   11/58   Germany.

OTHER REFERENCES

Justus Liebigs Annalen der Chemie, vol. 629 (March 1960), pages 222 to 240 (pages 230 to 234 and 238 to 240 particularly relied upon).

TOBIAS E. LEVOW, *Primary Examiner.*